United States Patent [19]
Cables

[11] Patent Number: 4,744,581
[45] Date of Patent: May 17, 1988

[54] ANTIJACKKNIFING MEANS

[76] Inventor: Gilbert Cables, 87 Kimberly Ave., Hamden, Conn. 06518

[21] Appl. No.: 898,631

[22] Filed: Aug. 21, 1986

[51] Int. Cl.$^4$ .................... B62D 53/00; B62D 53/06
[52] U.S. Cl. ................................................. 280/432
[58] Field of Search ............... 280/432, 438 A, 446 B, 280/400; 180/135

[56]  References Cited
U.S. PATENT DOCUMENTS
2,564,592  8/1951  Bishop .............................. 280/432

FOREIGN PATENT DOCUMENTS
2019332  10/1979  United Kingdom ............... 280/432

Primary Examiner—John J. Love
Assistant Examiner—Mitchell J. Hill
Attorney, Agent, or Firm—CTC & Associates

[57]  ABSTRACT

This invention deals with an antijackknifing device for tractor-trailer assemblies comprising a curved tracking bar mounted on the front of a trailer and a combination of gears and pistons translating the circular motion of the trailer in relation to the tractor into a controllable linear motion.

2 Claims, 3 Drawing Sheets

ANTIJACKKNIFING MEANS

BACKGROUND OF THE INVENTION

It is well known that tractor-trailer type truck assemblies, also commonly called "rigs", have the tendency to jackknife especially upon sudden stops, radical turns such as to avoid for instance collision and on slippery roads, resulting in the driver's loss of control over such a rig and possibly causing damage to the rig, other vehicles or injury or even death to driver and others. Many means have been suggested in the past to overcome or to at least minimize such jackknifing tendency, yet, none of these past attempts are believed to represent true remedies of the problem. The following references of interest provide an overview of typical devices offered in the past:

U.S. Pat. No. 903,884 (Przygode) teaches a motion checking device comprising a lever system leading to a piston and throttle arrangement designed to resist sudden motion of trailer with respect to tractor.

U.S. Pat. No. 2,461,212 (Hanna) describes a mechanically activated cylinder system to control the swing of trailer vehicles by the driver.

U.S. Pat. No. 2,470,383 (Wakeman) deals with device for stabilizing trailers consisting of a bracket attached to the front of the trailer which rests between a pair of convex discs mounted on the tractor, said discs being connected with pistons slidably mounted within cylinders, the latter containing hydraulic fluid; the rate of flow of the fluid can be restricted.

U.S. Pat. No. 2,565,285 (Wakeman) uses essentially the same principle as the above Wakeman reference except that the bracket is mounted on the tractor activating a piston and cylinder system attached to the trailer.

U.S. Pat. No. 2,709,088 (Orbits) suggest an anti-jackknifing system based on one or more piston-and-cylinder assemblies attached to the end of the tractor and to the underside of the trailer body.

U.S. Pat. No. 2,773,702 (Safko) is concerned with an anti-jackknifing device which when activated forces a pin from the trailer underbody into the slotted portion of the so-called fifth wheel thus restricting the movement of the trailer.

U.S. Pat. No. 3,850,449 (Link et al.) provides an anti-jackknifing device based on a piston-cylinder arrangement either restricting the motion of the trailer by being attached either to the fifth wheel or to the front of the trailer, the other end being connected with the tractor.

None of the above devices seem to have either fulfilled their expected purpose or were found acceptable by the trucking industry either for reasons of practicality, cost, or both.

SUMMARY OF THE INVENTION

It is the object of this invention to provide an efficient and controllable anti-jackknifing device;

It is a further object of the invention to provide with an anti-jackknifing device that is readily installed on existing tractor-trailer combinations;

It is another object of this invention to provide an anti-jackknifing device which does not interfere with usual driving conditions including excessive turns for maneuvering;

Other objects of this invention shall become apparent by the appended description and claims.

PREFERRED EMBODIMENTS OF THE INVENTION

Figure 1:
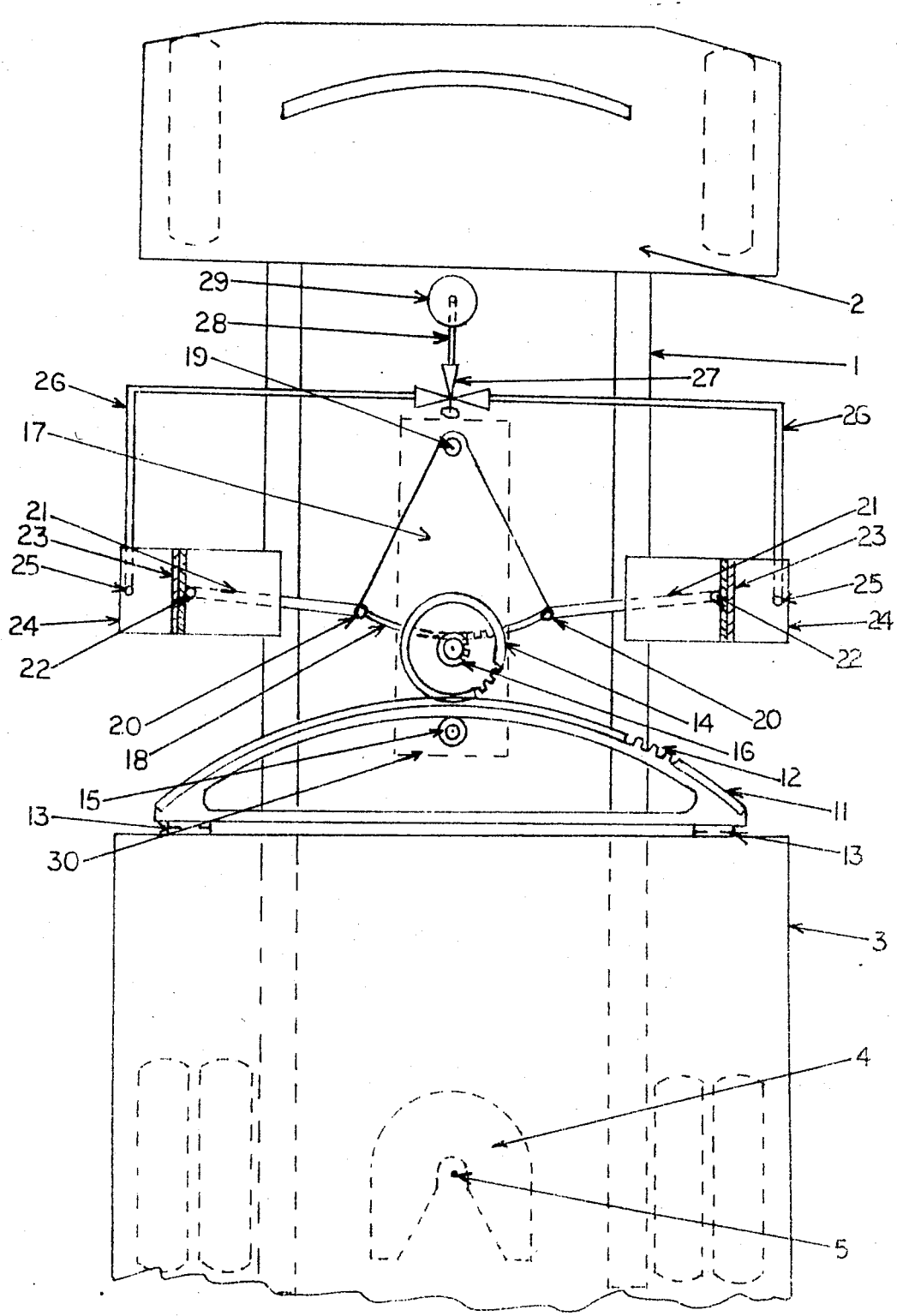
FIG. 1 is a fragmentary top plan view of a tractor-trailer combination showing a device of this invention.

Referring especially to FIG. 1, there are indicated in an abbreviated manner tractor 1 including cab 2, also front end of trailer 3 which rests on "fifth wheel" 4 of tractor 1; curved tracking bar 11 is attached to front of trailer 3 by hinges 13, said tracking bar 11 has an imaginary focal point 5 coincidental with the pivoting point of the trailer 3, said tracking bar formed as a gear 12 along its curved periphery; the gear 12 of the tracking bar 11 are made to intermesh with take-off gear 14 whereas pilot wheel 15 assures constant firm contact between tracking bar 11 and take-off gear 14; to the underside of take-off gear 14 there is firmly and permanently affixed control gear 16 which is caused to intermesh with the curved, geared face portion 18 of gear plate 17 which is having a pivotal point 19; at each side of gear plate 17 there are rotatably attached piston rods 21 at points 20, these piston rods 21 also being rotatably attached to pistons 23 at points 22; pistons 21 are slidably mounted within cylinders 24, the latter being suitably attached to frame or other suitable firm base of tractor and being equipped with tubular lines 26 at points 25; the lines 26 being joined at triple control valve 27, from which is also leading reservoir tube 28 to fluid reservoir 29. Take-off gear 14 with control gear 16, pilot wheel 15 and gear plate 17 are held in place by gear box 30.

Figure 2:
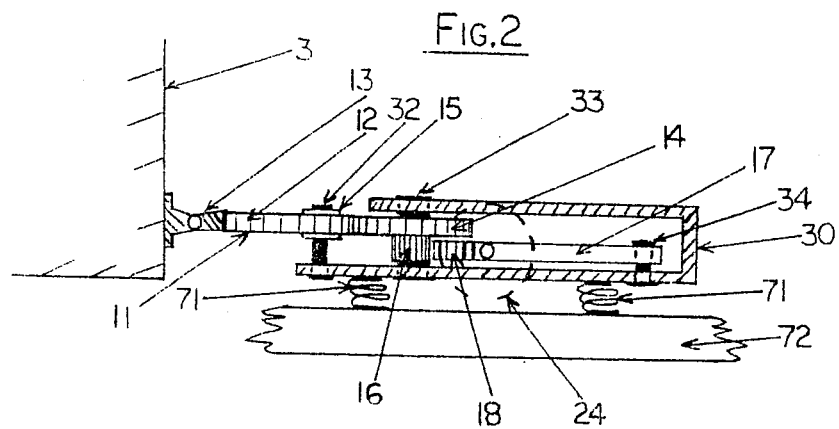
FIG. 2 provides an elevated side view of a partial device of this invention.

In FIG. 2 the locations and dimensions of the intermeshing gears etc. of the device of this invention are further illustrated, i.e. tracking gear 11 is shown to be attached to front of trailer 3 by hinge 13, whereas gear box 30 is flexibly mounted on frame portions 72 of tractor (not shown) by springs 71 in order to allow the gear box to compensate for the differences in distance between tractor and trailer due to unevenness of roads or terrain; take-off gear 14 and control gear 16 are rotatably mounted around shaft 33, and gear plate 17 is rotatably fastened by pivot shaft 34, there being an intermeshing relationship between gear portion 12 of tracking bar 11 with take-off gear 14 and between control gear 16 with the geared portion 18 of gear plate 17, respectively; pilot wheel 15 rests against non-geared inside of geared periphery 12 of tracking bar 11 and is rotatably mounted around shaft 32, the latter being attached to the bottom portion of gear box 30; also outlined is a cylinder 24 in a possible location.

When in use, pivotal motion of trailer versus tractor around point 5 of fifth wheel 4 is sensed by tracking bar 11 extending forward of trailer 3, said tracking bar 11 being held firmly in place against take-off gear 14 by pilot wheel 15 which is free to roll along the inside of geared periphery 12 of tracking bar 11, whereas said motion is communicated to take-off gear 14 and to control gear 16, that latter causing sideways motion of gear plate 17, said sideways motion activating pistons 23 to move within cylinders 24 forcing hydraulic fluid to leave or enter the cylinder, respectively; the rate of fluid flow is, however, determined by the setting of control valve 27: the narrower the fluid path through control valve 27 the more restricted the rate of piston motion within the cylinders, and correspondingly, the wider the fluid path through control valve 27 the more readily pistons 23 may be moved within cylinders 24. If a situation arises where a sudden turn of the tractor may initiate possible jackknifing of the rig, the flow of fluid will be so restricted by the control valve 27 that extreme movement of the pistons is prevented, this restriction of movement or rate of motion being in turn exerted on gear plate 17, control gear 16, take-off gear 14 and tracking bar 11 so that it is believed that uncontrollable motion of the trailer in relation to the tractor is hindered or eliminated.

There are certain critical aspects to this invention, namely, the angle, within which the tracking bar and the gear plate may be constructed as well as the radii of geared members; the angle measured at the pivot point of the fifth wheel may be 70-95 degrees, preferably 70-90 degrees and most preferably 75-85 degrees; the imaginary radius of the geared periphery 12 of tracking bar may be 48-66 inches, preferrably 50-62 inches, most preferrably 55-60 inches; whereas the ratio of said radius to that of the radius of take-off gear 14 may be 6-12, preferably 7-11, most preferably 7-10; a similar relationship exists between the radius of the geared portion 18 of the gear plate 17 and the radius of the control gear 16 should be 7.5-21, preferably 10.5-21, usually 12-21, so that the overall ratio is equal to 1.25-3.5, preferably 1.5-3, most preferably 2-3, so that the angular width of the gear plate may have these limits: 20-76 degrees, preferably about 23-60 degrees, most preferably 25-42.5 degrees.

Another aspect of this invention is the ability of the device of this invention to compensate for the movement of the tracking bar vis-a-vis the gear box due to unevenness of road or terrain. As already indicated above in FIG. 2, the gear box may be flexibly mounted with enough give to allow operation of the tractor-trailer unit over rough roads, railroad crossings and the like, yet, without losing its effectiveness as an anti-jackknifing device. Instead of having the gear box flexibly mounted, the tracking bar may be attached to the trailer so as to provide flexibility sufficient to compensate for the above indicated movement. Also, both basic elements of this invention, tracking bar and gear box, may both have a certain degree of flexibility.

Figure 3:
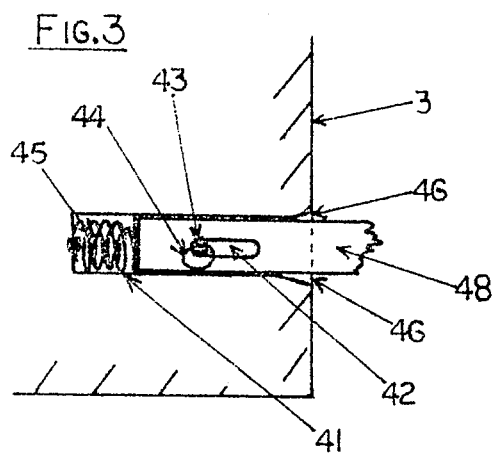
FIG. 3 is a side elevated view of means for attaching a tracking gear of this invention to a trailer.
Figure 4:
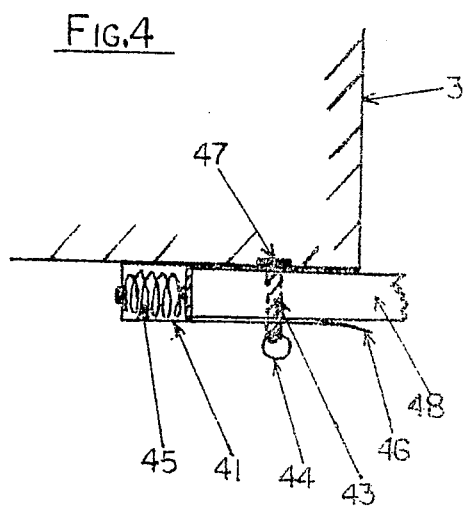
FIG. 4 is a top plan view of FIG. 3.

Means for achieving such flexibility are indicated in FIGS. 3 and 4, where a track casing 41 is mounted to the side of a trailer, said casing 41 having flared entry portion 46, spring 45 held within permanently against the back of said casing 41, the latter having fastening pin 43 penetrating the full width of the casing with its widened end 47 resting against inside wall of trailer box 3 restricting its outward movement, said pin 43 also being capable of receiving a cotter pin like arrangement 44 to prevent slippage or loss of pin 43 during use; fastening pin 43 facilitates locking in extended portion 48 of tracking bar (not shown) which has its forward movement restricted by fastening pin 43 which is penetrating slot 42 of extended portion 48, the latter being pushed to its outward limits by spring 45 (when the device is in actual use in combination with gear box 30, the pin 43 will be located approximately in the middle of slot 42, spring 45 being of course more compressed).

Figure 5:
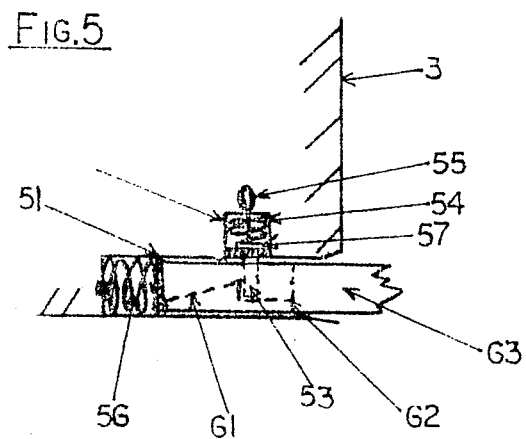
FIG. 5 is a side elevated view of attaching means for the tracking of this invention forming an integral part of the trailer.
Figure 6:
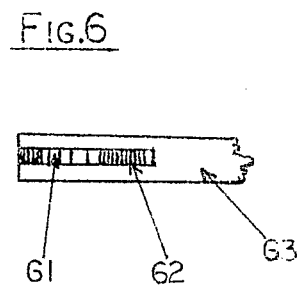
FIG. 6 is a fragmentary plan view of the grooved insert portion of a tracking bar of this invention.

FIGS. 5 and 6 provide another embodiment of a tracking bar fastening means of this invention indicating a casing 51 forming an integral part of the body of the trailer 3, said casing 51 having a slightly flared configuration at the forward end, and within a coiled spring 56 attached to the other end; on top and about in the middle of the total casing length is located a housing 52 containing locking pin 53 having pressure exerted on its extended head portion 57 by spring 54 causing said pin 53 to reach substantially into the grooved portion 62 of extension 63 of tracking bar (not shown); a slanted portion 61 of grooved portion of extension 63 allows sliding the tracking bar extension into the casing 51 pushing pin 53 upward until spring 54 can cause the pin to reach into deepened groove 62. For disengagement pin 53 may be pulled up with ring 55 to free extension 63.

A further aspect of this invention includes the use of releasing means of the tracking bar from being engaged with the take-off gear and pilot wheel combination which may be desired where, for the purpose of maneuvering the rig, the overall angle may exceeded that of the tracking bar as above indicated, the tracking bar may be attached to the front of the trailer or trailer box by hinges so as to allow the tracking bar to be moved upward and out of engagement. Also, the tracking bar may be hingeably connected with the tracking bar extension, and, depending on location or configuration of the assembly of this invention used, may be tilted upward or downward in order to disengage. It is envisioned that a suitable locking device is used to hold the tracking bar in an engaged position; disengagement may be caused either by releasing the tracking bar from engagement by remote control, or manually or by a tripping mechanism which will automatically cause disengagement when the angle of movement exceeds that of the tracking bar.

Although the above drawings indicate the use of two cylinders, flow restriction may be achieved by one or by more than two cylinder-type arrangements, depending on available space and efficiency. The means for translating the circular motion of the gear plate to linear motion of the piston is not critical as long as care is taken that such means has the necessary freedom of movement over the total range required, caused by the sideways movement of the gear plate.

Restriction of fluid flow is suggested above by valving means which may be operated manually or by remote control such as by the driver depending on driving conditions or in case of imminent need for sudden or drastic maneuvering.

The hydraulic fluid reservoir is preferably kept under pressure either exerted onto the fluid level by a piston-and-spring arrangement or preferably by inert gas or air pressure, the latter being conveniently supplied by the air pump for the brake system of the tractor.

Although the above description essentially outlines certain embodiments of this invention, modifications and variations of aspects of this invention are considered well within the scope of the appended claims.

What is claimed is:

1. An anti-jackknifing device for tractor-trailer assembly comprising a curved geared tracking bar attached to the forward end of a trailer, means for sensing the motion of said tracking bar, such sensing means comprising pilot wheel and take-off gear, the latter being connected with control gear meshing with gear plate, wherein said take-off gear, control gear, pilot wheel and gear plate are held in their respective relationship by a gear box; and means for translating circular motion into linear motion of piston plus cylinder arrangement and means for restricting the flow of fluid caused by the motion of the piston in the cylinder; wherein the angle of said tracking bar measured at the pivotal point is 70-95 degrees, the radius of said tracking bar is 50-62 inches, the ratio of the radius of said tracking bar to the radius of said take-off gear is 6-12, the radius of said gear plate to the radius of said control gear is 7.5-21, said gear plate having an angular width 20-76 degrees, and wherein said tracking bar is disengageable from said sensing means.

2. The device of claim 1 wherein said tracking bar is attached to said trailer by means allowing disengagement when not in use.

* * * * *